United States Patent
Stephens

(10) Patent No.: US 8,219,095 B2
(45) Date of Patent: Jul. 10, 2012

(54) BASE STATION FOR A CELLULAR COMMUNICATION SYSTEM AND A METHOD OF OPERATION THEREFOR

(75) Inventor: Paul Stephens, Swindon (GB)

(73) Assignee: Motorola Mobility, Inc., Libertyville, IL (US)

( * ) Notice: Subject to any disclaimer, the term of this patent is extended or adjusted under 35 U.S.C. 154(b) by 193 days.

(21) Appl. No.: 12/742,418

(22) PCT Filed: Oct. 7, 2008

(86) PCT No.: PCT/US2008/079056
§ 371 (c)(1),
(2), (4) Date: May 11, 2010

(87) PCT Pub. No.: WO2009/064553
PCT Pub. Date: May 22, 2009

(65) Prior Publication Data
US 2010/0267387 A1   Oct. 21, 2010

(30) Foreign Application Priority Data
Nov. 16, 2007   (GB) .................................. 0722502.2

(51) Int. Cl.
*H04W 36/00*   (2009.01)

(52) U.S. Cl. ........ 455/436; 455/443; 455/437; 455/438; 455/525; 370/331; 370/332

(58) Field of Classification Search .................. 455/436, 455/437, 67.1, 552, 422, 433, 434, 435, 553, 455/450, 438, 443, 524, 525, 561; 370/331, 370/332, 336
See application file for complete search history.

(56) References Cited

U.S. PATENT DOCUMENTS

| 6,295,451 | B1 * | 9/2001 | Mimura | 455/436 |
| 6,510,146 | B1 * | 1/2003 | Korpela et al. | 370/332 |
| 6,801,772 | B1 * | 10/2004 | Townend et al. | 455/436 |
| 2003/0002460 | A1 | 1/2003 | English | |
| 2003/0002525 | A1 * | 1/2003 | Grilli et al. | 370/465 |

(Continued)

FOREIGN PATENT DOCUMENTS

EP   1 611 758 B1   5/2008

(Continued)

OTHER PUBLICATIONS

Chandra et al. (IEEE publication 1997) Applicant submitted IDS reference in submission filed May 11, 2010.*

(Continued)

*Primary Examiner* — Anthony Addy
*Assistant Examiner* — Manpreet Matharu

(57) ABSTRACT

A base station (101) for a cellular communication system comprises a transceiver (301) which receives measurement reports from a plurality of user equipments (107) served by the base station (101). The measurement reports comprise receive signal quality indications (such as receive signal levels for pilot signals) for neighbor cells (A-F) of the base station (101). An overlap processor (301) determines a cell overlap indication for each of a set of neighbor cells in response to the receive signal quality indications and a handover control processor (305) performs handover control in response to the cell overlap indications. The invention may allow improved handover performance and may increase the likelihood that the target handover cell can continue to support the user equipment (101) following handover. Particularly advantageous performance can be achieved when used for congestion relief of cells.

8 Claims, 5 Drawing Sheets

U.S. PATENT DOCUMENTS

2005/0277416 A1    12/2005    Tolli et al.
2006/0121906 A1*    6/2006    Stephens et al. .............. 455/446
2009/0207811 A1*    8/2009    Zhu et al. ..................... 370/332

FOREIGN PATENT DOCUMENTS

GB            2 301 733 A       12/1996

OTHER PUBLICATIONS

Gareth Griffiths, "Parent Application GB 0722502.2—Search Report under Section 17," United Kingdom Intellectual Property Office, Patents Directorate, Newport, South Wales, Mar. 20, 2008, 4 pages, most relevant p. 4.

Gu Ung Jung, "Corresponding Application PCT/US2008/079056—PCT International Search Report and Written Opinion," WIPO, ISA/KR, Korean Intellectual Property Office, Daejeon, Republic of Korea, Mar. 16, 2009, 10 pages, most relevant pp. 7, 9-10.

C. Chandra et al., "Determination of Optimal Handover Boundaries in a Cellular Network Based on Traffic Distribution Analysis of Mobile Measurement Reports," 1997 IEEE 47th Vehicular Technology Conference, May 4-7, 1997, vol. 1, pp. 305-309.

* cited by examiner

BASE STATION FOR A CELLULAR COMMUNICATION SYSTEM AND A METHOD OF OPERATION THEREFOR

FIELD OF THE INVENTION

The invention relates to a base station for a cellular communication system and a method of operation therefor, and in particular, but not exclusively, to handover for congestion relief in a cellular communication system.

BACKGROUND OF THE INVENTION

The frequency band allocated for a cellular communication system is typically severely limited, and therefore the resource must be effectively divided between remote/mobile stations. A fundamental property of a cellular communication system is that the resource is divided geographically by the division into different cells. An important advantage of a cellular communication system is that due to the radio signal attenuation with distance, the interference caused by communication within one cell is negligible in a cell sufficiently far removed, and therefore the resource can be reused in this cell. In order to optimise the available communication capacity in a cellular communication system, it is advantageous to have the mobile stations distributed over different cells in accordance with the available communication capacity.

A system design based on cells is typically based on an ideal cell pattern. However, an idealised cell pattern never occurs in practice, due to the nature of the physical and propagation environment and the fact that cell sites and antennae are not ideally located on a regular grid pattern. The network designer therefore uses frequency planning tools to estimate the radio propagation for each cell and predict a corresponding coverage area. Based on these propagation models, the network designer is able to develop a frequency plan for the network intended to minimise the expected interference and optimise coexistence between the different cells. The frequency plan considers such factors as antenna heights and location, terrain topology, transmitted power levels, the anticipated number of subscribers, the traffic mix etc.

However, although such frequency plans may provide acceptable performance in many scenarios they also have associated disadvantages. For example, the propagation models used to estimate radio propagation conditions may often be less accurate than desired. Also, even if such propagation estimates are based on previous measurements of radio conditions in a live system, the resulting estimates tend to be typical values reflecting past behaviour. In addition, the centralised nature of frequency planning operations require a large amount of measurement data to be collected centrally which may complicate the operation of the cellular network and use high amounts of the limited bandwidth resource of the network. Furthermore, the derived frequency plan tends to reflect expected or estimated conditions which are typically derived from average conditions determined in the past and are not able to reflect and adapt to the future instantaneous conditions of the system which may deviate significantly from the typical conditions.

A frequently encountered problem is where one or more cells is congested and do not have available resource for supporting additional mobile stations (or is close to being congested). Congestion causes calls to be dropped or the quality to be reduced and it is therefore desirable to reduce the probability of congestion occurring. Often, additional resource may be available in other cells, and therefore many cellular communication systems comprise algorithms attempting to utilise such resource.

Although frequency plans may be used to reduce the probability of such dynamic congestion occurring, it cannot be avoided without dimensioning the system for worst case conditions which would result in excessive cost and complexity of the system. Therefore, cellular communication systems often comprise some form of congestion relief management which operates when congestion occurs in a cell. This management seeks to distribute traffic across different frequency resources and specifically seeks to move traffic to neighbouring cells having available capacity.

For example, current $3^{rd}$ Generation Partnership Project (3GPP) Standards proposals describe the concept of handing over traffic to suitably qualified neighbors based on congestion overload of the serving cell. Such handover can be based on assessment of the current propagation conditions between the mobile station and the neighbors as well as the current loading of the neighbour base stations. Typically, a call may be handed over to a neighbour cell from a congested cell if the neighbour cell is not congested and the radio propagation conditions are considered sufficiently good to support the call (for example as estimated on the basis of a measured signal level for a pilot signal transmitted by the neighbour cell).

However, although such conventional congestion relief may substantially alleviate the situation it also tends to have some disadvantages. In particular, the conventional approach tends to provide suboptimal performance and to reduce the quality of service experienced by the mobile stations. More specifically, the current congestion relief handover approach is based on a determination of the neighbour cell's current ability to support the call but does not reflect the neighbour cell's ability to continue to support the call. Accordingly, it frequently occurs that a mobile station is successfully handed over to another cell followed by the call being dropped within a relatively short time interval because the new cell cannot continue to support the call (e.g. because the propagation conditions deteriorate or the mobile station moves outside the area supported by the new cell).

Hence, an improved cellular system would be advantageous and in particular a system allowing increased flexibility, reduced complexity, facilitated operation, facilitated implementation, improved congestion relief, improved handover performance, improved continued support of communication services following handovers and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a base station for a cellular communication system, the base station comprising: means for receiving measurement reports from a plurality of user equipments served by the base station, the measurement reports comprising receive signal quality indications for neighbour cells of the base station; overlap means for determining a cell overlap indication for each of a set of neighbour cells in response to the receive signal quality indications; and control means for performing handover control in response to the cell overlap indications.

The invention may provide facilitated operation, implementation and/or performance. In particular, the invention may allow improved handover performance and may in many scenarios allow a handover with increased probability of the destination cell being able to continue to support the communication handed over.

The implementation of functionality in a base station allows a simple implementation and/or facilitates operation and may in many embodiments allow an efficient localised traffic management which does not necessitate a centralised control. The operation of the base station may e.g. reduce the requirement for communicating data between the base station and a centralised controller (such as measurement reports, receive signal quality indications or control data for performing a handover control).

The cell overlap indication may be any measure or value indicative of a cell overlap and may specifically be a cell overlap estimate. The set of neighbour cells may include all neighbour cells of the cell of the base station or may be a subset thereof.

In many embodiments, the determination of cell overlap indications may reduce resource usage as a reduced computation, communication and/or storage of data can be achieved.

The measurement reports may be standard measurement reports provided for other purposes, such as measurement reports used for conventional handover algorithms. The receive signal quality indications may for example be signal level or signal to noise/interference ratio measures generated by the user equipments in response to receiving a pilot signal from each of the neighbour base stations. For example, for a Global System for Mobile communication (GSM) system, the receive signal quality indications may be RxLEV measurements received from the user equipments for base stations included in the neighbour list.

According to another aspect of the invention there is provided a cellular communication system comprising a base station, the base station comprising: means for receiving measurement reports from a plurality of user equipments served by the base station, the measurement reports comprising receive signal quality indications for neighbour cells of the base station; overlap means for determining a cell overlap indication for each of a set of neighbour cells in response to the receive signal quality indications; and control means for performing handover control in response to the cell overlap indications.

According to another aspect of the invention there is provided a method of operation of a base station for a cellular communication system, the method comprising: receiving measurement reports from a plurality of user equipments served by the base station, the measurement reports comprising receive signal quality indications for neighbour cells of the base station; determining a cell overlap indication for each of a set of neighbour cells in response to the receive signal quality indications; and performing handover control in response to the cell overlap indications.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a base station for a GSM cellular communication system and in particular to a GSM system including additional functionality in accordance with standards for the Long Term Evolution (LTE) of the GSM system. However, it will be appreciated that the invention is not limited to this application but may be applied to many other cellular communication systems.

Figure 1:
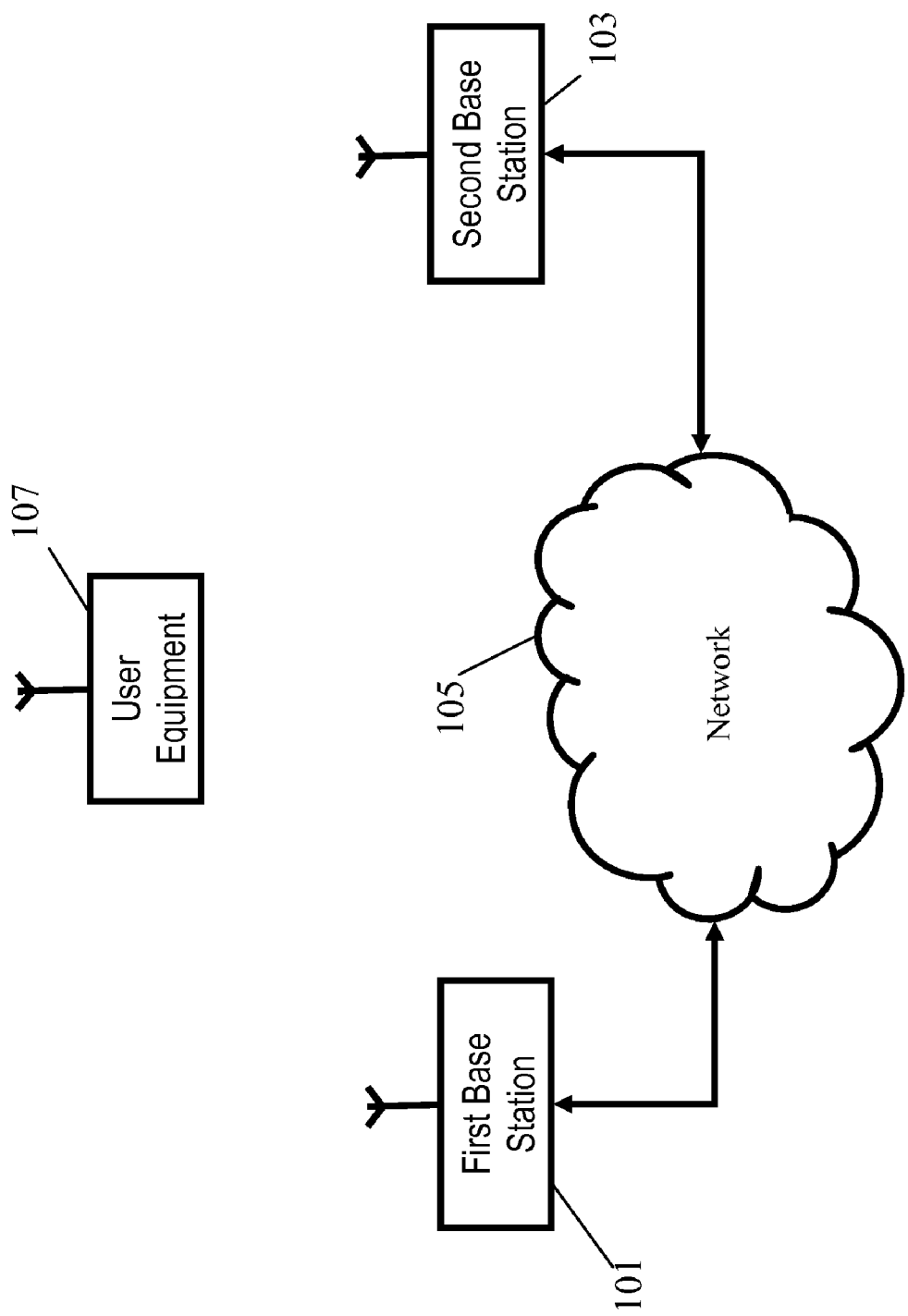
FIG. 1 is an illustration of a cellular communication system in accordance with some embodiments of the invention.

FIG. 1 illustrates some elements of a cellular communication system in accordance with some embodiments of the invention.

FIG. 1 illustrates a first and a second base station 101, 103 connected to an interconnecting network 105. Each of the base stations 101, 103 support a cell of the cellular communication system and the network 105 represents the infrastructure functionality of the GSM system required or desired for the operation of the system. Thus, as will be well known to the person skilled in the art, the network 105 includes Base Station Controllers (BSCs), Mobile Switch Centres (MSCs), Operations and Maintenance Centres (OMC) etc.

FIG. 1 also illustrates a user equipment 107 which can communicate with a base station over the GSM air interface. In the specific example, the user equipment 107 is currently located in the cell supported by the first base station 101 and is currently served by this base station 101. The user equipment may dependent on the specific embodiment for example be a remote station, a GSM mobile station, a communication unit, a 3rd Generation User Equipment (UE), a subscriber unit, a mobile station, a communication terminal, a personal digital assistant, a laptop computer, an embedded communication processor or any physical, functional or logical communication element which is capable of communicating over the air interface of the cellular communication system.

It will be appreciated that although FIG. 1 for brevity and clarity illustrates only a single user equipment 107 and two base stations 101, 103, these are merely illustrated as representatives of typically a large number of user equipments and base stations.

In a typical cellular communication system, cells are generally designed to be overlapping such that user equipments in the overlap area typically can be served by more than one base station. This ensures improved reliability and substantially reduces the number of dropped calls and may in addition provide additional capacity for the overlap areas. Indeed, the cell overlap between cells may often be quite significant.

Typically, the cell overlap between cells depends not only on propagation conditions and geographical characteristics but also on the specific communication service. For example, the coverage overlap for a low data rate service with low Quality of Service characteristics may be very high whereas the coverage overlap for a high data rate service with e.g. strict delay requirements may be significantly lower. Indeed, in many systems cell coverage may be completely overlapping for the most basic level of service but only partially overlapping for higher levels of service, where the service criteria requires better C/I conditions to guarantee the quality of service. Accordingly, in the following, references to cell coverage overlaps may be considered as service specific cell coverage overlaps in many embodiments.

Figure 2:
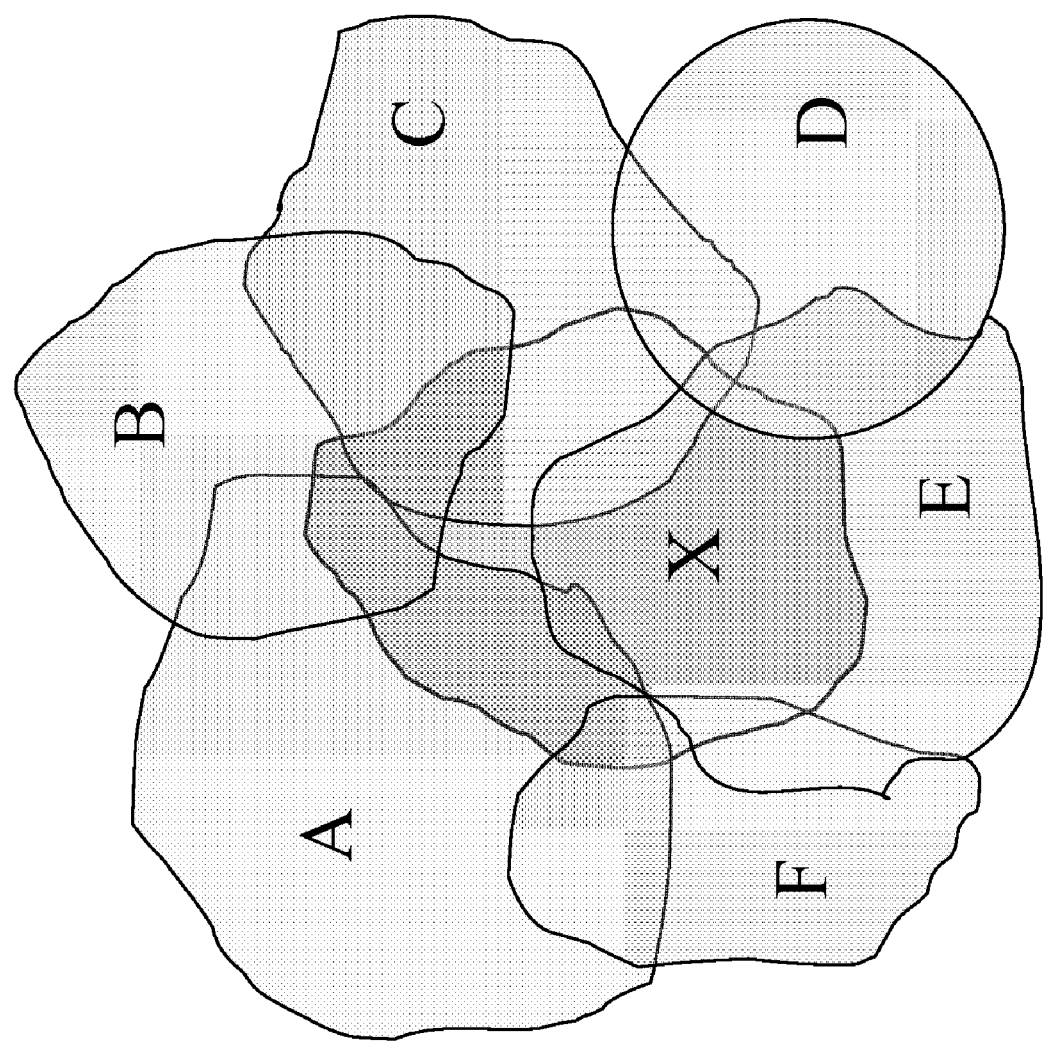
FIG. 2 is an illustration of a cell overlap for the cellular communication system of FIG. 1.

FIG. 2 illustrates an example of a possible cell layout for a set of cells of the GSM system of FIG. 1. In the example, a cell X is supported/formed by the first base station 101 and is overlapped by six neighbour cells A-F. As illustrated, the overlap area of the different cells may vary substantially and furthermore some areas may be overlapped by a plurality of neighbour cells.

In the described embodiments, the first base station 101 is arranged to determine cell overlap indications for each of the neighbour base stations A-F where the cell overlap indication is indicative of a size of the overlap areas between the cell X of the first base station 101 and the cell A-F for which the overlap indication is generated.

The cell overlap indications are generated from measurement reports of neighbour base stations received from user equipments served by the first base station 101. Thus, in accordance with the described example, cell overlap data is stored at each base station such that for each of the neighbor cells, it is possible to assess the cell overlap.

The first base station 101 is arranged to perform handover control in response to the generated cell overlap indications. Specifically, a communication service may be biased away from cell X towards one of the neighbour cells A-F depending on the overlap indications. For example, when handing over, the first base station 101 may select the destination cell as the one having the highest cell overlap.

Specifically, the cell overlap indication may represent a statistical likelihood of a current call being supported by the corresponding neighbour cell. For example, if 80% of the measurement reports received at cell X indicate that the level of cell E is sufficient to support the connection, then it can be assumed that there is a significant coverage overlap between these two cells (assuming a relatively uniform distribution of user equipments). The importance of this is that if it is necessary to hand over a call due to e.g. congestion at the first base station 101 and there are two or more similarly qualified neighbor cells in terms of current signal strength etc, then improved performance can be achieved if the call is handed over to the cell with most overlap. Indeed, this cell is most likely to be able to continue to support the user equipment as e.g. any movement of this is more likely to remain in the overlap area if this is large than if it is small. Thus, the cell with higher overlap area statistically has the best chance of continuing to serve that connection.

The described approach may in particular improve handover performance associated with congestion relief and may specifically reduce the number of dropped calls and/or the number of additional subsequent handovers required to maintain the call.

Figure 3:
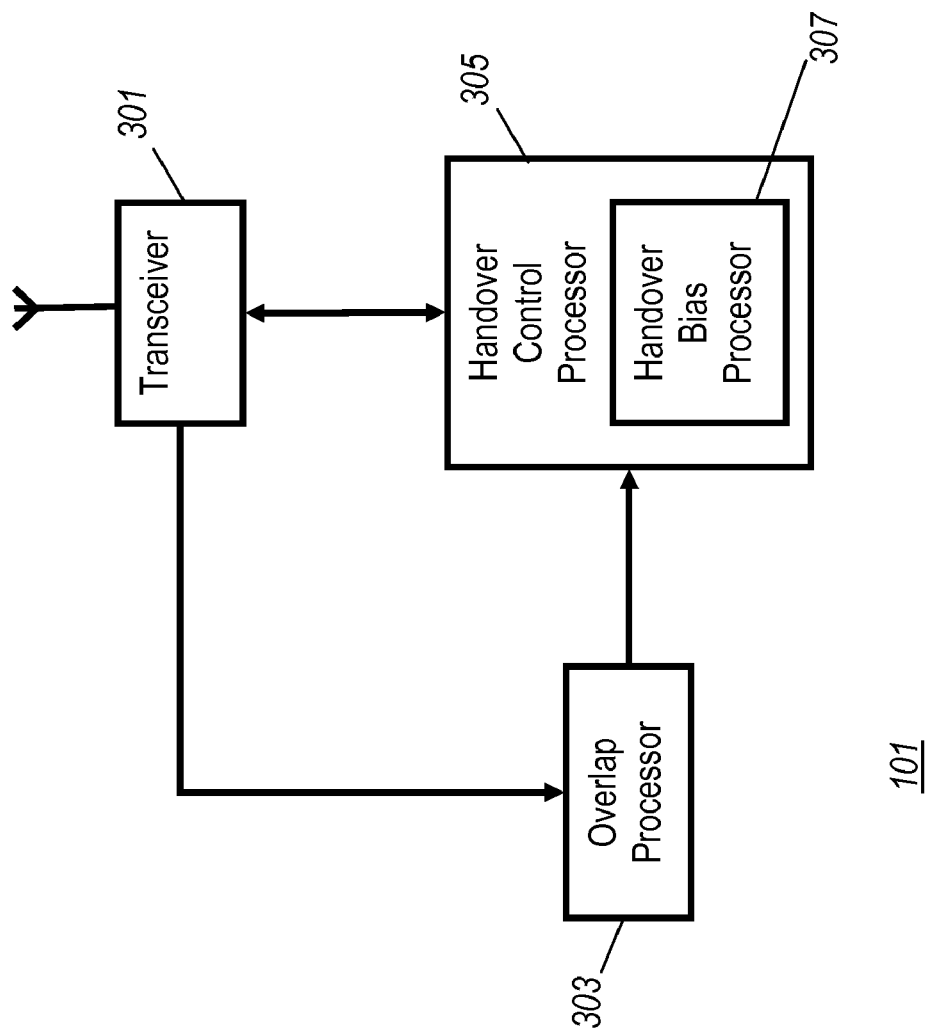
FIG. 3 is an illustration of a base station in accordance with some embodiments of the invention.

FIG. 3 illustrates the first base station 101 in more detail.

The first base station 101 comprises a transceiver 301 which is capable of communicating with user equipments 107 over the GSM air interface in accordance with the technical standards of the GSM communication system.

The transceiver 301 can in particular receive measurement reports from all user equipments 107 that are currently served by the first base station 101. In accordance with the GSM specifications, the user equipments 107 measure the receive level of the pilot signals (Broadcast Control CHannel (BCCH) transmissions) transmitted by the base stations (103) included in the neighbour list for the first base station 101. The user equipments 101 then generate measurement reports comprising the measured signal level measurement (RxLEV) transmits these back to the first base station 101 where they are received by the transceiver 301.

It will be appreciated that although the GSM system uses receive signal levels as an indication of the receive quality from the neighbour base stations 103, other receive signal quality indications may be used in other embodiments. For example, for other cellular communication systems, a signal to noise or interference value may be measured for each neighbour base station and reported back to the serving base station.

In the specific example, the transceiver 301 receives the receive signal level indications for the pilot signals of the neighbour base stations 103 of cells A-F.

The transceiver 301 is coupled to an overlap processor 303 which is arranged to determine a cell overlap indication for each of a set of neighbour cells in response to the receive signal quality indications.

In the specific example, the overlap processor 303 determines, for each received receive level measurement, if the measurement meets a specific quality criterion. The quality criterion may be selected to suit the specific requirements and preferences of the individual embodiment and scenario. In some embodiments, the same criterion may be used by all base stations and at all times whereas in other embodiments different criteria may be used by different base stations and/or the criterion may be dynamically adapted to the current conditions.

In the example, the quality criterion used by the first base station 101 is such that if the criterion is met the measured quality level is considered sufficient for the user equipment making the measurement to be supported by the neighbour cell that has been measured. Accordingly, as the coverage area of a neighbour cell can be considered to be the area in which the neighbour cell can support the user equipment, receive signal quality indication that meets the quality criterion can be considered to be within the overlap area between cell X and the neighbour cell A-F for which the measurement was made.

As an efficient yet low complexity example, the first criterion can comprise a requirement that the receive signal quality indication is indicative of a receive signal quality level which is above a threshold. Specifically, for each received receive level measurement the overlap processor 303 can simply evaluate whether the received level is above a predetermined threshold.

The overlap processor 303 then proceeds to generate the cell overlap indication for each neighbour cell by determining the proportion of the receive signal quality indications for the neighbour cell that meets a quality criterion.

As an estimate, it may be considered that any user equipment reporting a receive signal level for the neighbour cell that exceeds the threshold is within the overlap area of a neighbour cell and that any user equipment reporting a receive signal level for the neighbour cell that does not exceed the threshold is outside the overlap area. Specifically, for uniform distribution of user equipments (with the same reporting rate), the proportion of measurement reports that meets the quality criterion corresponds closely to the proportion of the cell area which is overlapped by the neighbour cell.

Thus, the overlap processor 303 determines cell overlap statistics by for each suitable interval and for each neighbour cell performing the following steps:

- Count the number of measurement reports for which that neighbour had adequate receive level to support the call (i.e. the number of measurement reports meeting the quality criterion).
- Generate a cell overlap indicator as the percentage of the total measurement reports for the cell which meets the quality criterion.

Thus, as a result the overlap processor 301 may, e.g. for the example of FIG. 2, generate a prioritised list of cell overlap indications, such as (1) Cell X: neighbour E 60% overlap
(2) Cell X: neighbour C 28% overlap
(3) Cell X: neighbour A 23% overlap
(4) Cell X: neighbour B 18% overlap
(5) Cell X: neighbour F 9% overlap
(6) Cell X: neighbour D 7% overlap The overlap processor 303 is coupled to a handover control processor 305 which is arranged to perform handover control in response to the cell overlap indications.

The handover control processor 305 controls the handover operation of the user equipments 101 served by the first base station 101. It will be appreciated that such handover control may comprise algorithms, criteria and approaches for handovers that will be known to the skilled person from conventional cellular communication systems. However, the handover control processor 305 is furthermore arranged to perform handover control for at least one user equipment 107 in response to the cell overlap indications generated by the overlap processor 303.

For example, the handover control processor 305 may use conventional approaches or criteria for determining that a handover of the user equipment 107 is required and may furthermore use conventional considerations of e.g. receive levels measured for the neighbour cells to select a subset of neighbour cells that are considered to be capable of supporting the user equipment 107 following the handover. The handover control processor 305 may then select a neighbour cell from this subset based on the cell overlap indication. For example, if the receive signal level measurements indicate that sales C, B and D can support the user equipment 107, the handover control processor 305 can proceed to initiate a handover of the user equipment 107 to cell C as this has the highest cell overlap with cell X.

As another example, the qualifying handover candidates can be determined in response to a function of both the calculated cell overlap percentage and the margin by which the receive level exceeds a predetermined threshold considered to be sufficient for supporting the user equipment 107.

Specifically, the handover control processor 305 can generate a preference measure for each of the neighbour cells A-F where the preference measure is a function of the cell overlap indication and a receive quality indication. E.g. a preference value can be determined as a product of the cell overlap percentage and the received signal level. The handover control processor 305 can then proceed to generate a subset of neighbour cells as possible handover candidates by selecting only the neighbour cells for which the preference measure meets a given criterion, such as a requirement that the preference measure is above a given threshold. As specific example, the criterion may simply be that the preference value should be the highest preference value for any of the neighbour cells resulting in the subset comprising only a single neighbour cell, namely the one having the highest preference measure.

Such an approach may provide a high degree of flexibility and will especially in many embodiments allow an improved handover performance wherein there is an increased likelihood of continued support by the handover target base station following the handover.

In the example of FIG. 3, the handover control processor 305 comprises a handover bias processor 307 which is arranged to bias at least one communication supported by the first base station 101 towards a different base station 103 if a current air interface traffic characteristic for the base station meets a given criterion.

The criterion can specifically be that the first base station 101 (and thus cell X) is congested. For example if a current loading of the first base station 101 (for example determined as the ratio between the currently used radio resource and the maximum radio resource capacity of the first base station 101) exceeds the threshold, the handover bias processor 305 can proceed to introduce a handover bias for a least one of the user equipments 107. The bias is such that it will result in an increased probability that the user equipment 107 will perform a handover to another cell thereby reducing the congestion level of current cell.

The combination of congestion relief and a consideration of the cell overlap indications will provide particularly advantageous performance in many scenarios. In particular, whereas conventional handover algorithms are mainly aimed at providing continuous coverage for user equipments, congestion relief handovers are often performed for user equipments well within a congested cell. Thus, congestion relief handovers are significantly more likely to suffer reduced quality and reliability following the handover and is for example more likely to subsequently be dropped than for a handover performed in order to follow the user equipment into a different cell.

Accordingly, the consideration of the cell overlap between the cells results in a particularly high performance improvement and improved handover performance for congestion relief handovers.

In the following, a more specific example of the operation of the handover control processor 305 and the handover bias processor 307 will be described with reference to FIG. 4 which illustrates a method of operation for the first base station 101.

The method initiates in step 401 wherein the handover control processor 305 evaluates whether the first base station 101 is currently congested. The handover control processor 305 can specifically compare the current loading of the first base station 101 with a predetermined threshold. If the current loading is below the threshold, the first base station 101 is considered not to be congested and the method remains in step 401.

If the current loading however exceeds the threshold, the first base station 101 is considered to be congested and the handover control processor 305 proceeds to select a subset of neighbour base stations/cells from the plurality of neighbour base stations/cells as the base stations/cells meeting a handover criterion.

Thus, if the cell is congested, the handover control processor 305 seeks to provide congestion relief by biasing user equipments 107 away from the first base station 101 towards neighbour base stations 103. The possible candidate neighbour base stations 103 are elected such that they meet a handover criterion which is selected to correspond to a high likelihood that the user equipment 107 can be supported by the base stations 103 of the candidate set.

In the specific example, the subset of neighbour base stations 103 is selected in response to both receive signal levels, backhaul capability, radio resource availability and the cell overlap indications. Furthermore, in the example, each of these parameters is considered sequentially and independently. However, it will be appreciated that in other embodiments other parameters may be considered, the order in which the parameters are considered may be different and/or parameters may be considered together and may be combined in different ways.

In the specific example step 401 is followed by step 403 wherein the handover control processor 305 evaluates a condition of the handover criterion that requires that a receive signal level indication for the neighbour cell base station 103 meets a criterion. For example, the handover control processor 305 can for each neighbour base station/cell compare a (time averaged) receive signal level reported from the user equipment 107 to a predetermined threshold and can exclude the neighbour cells for which the predetermined threshold is not exceeded. It will be appreciated that in many embodiments the relative signal level difference between the neighbour cell and the serving cell will be used rather than the absolute measured signal level for the neighbour cell.

Following step 403, the subset accordingly comprises only neighbour cells for which the current propagation conditions and location of the user equipment 101 are such that the user equipment 107 can be supported in the neighbour cell.

Step 403 is followed by step 405 wherein the handover control processor 305 evaluates a condition of the handover criterion which requires that an available backhaul resource for the neighbour cell base station meets a criterion.

In step 405 the handover control processor 305 determines if it is sufficiently likely that the potential handover candidates have sufficient available backhaul capacity to support the user equipment 107 following the handover. For example, the handover control processor 305 can via the network 105 receive indications of the currently unused backhaul resource from the neighbouring base stations 103. It can then estimate the backhaul requirement for the user equipment 107 (e.g. simply based on a measurement of the backhaul capacity that is currently used by the first base station 101). Accordingly, any base station for which the available backhaul capacity does not exceed the required backhaul resource (e.g. with a certain margin) will be removed from the subset.

Step 405 is followed by step 407 wherein the handover control processor 305 evaluates a condition of the handover criterion that requires that an available radio resource for the neighbour cell base station meets a criterion.

For example, the handover control processor 305 can receive indications of the air interface resource which is currently not used by the neighbour base stations. These indications may be directly exchanged between the base stations 101, 103 via the network 105. The handover control processor 305 can then assess the required air interface resource for the first user equipment 107 and proceed to remove any neighbour base stations for which the available air interface resource is insufficient (e.g. with a suitable margin).

Thus, following step 407, the handover control processor 305 has generated a subset of potential handover candidates which are considered highly likely to be able to continue to support the user equipment 107 following a handover.

Step 407 is followed by step 409 wherein the handover control processor 305 continues to consider the cell overlap indications in order to identify one or more suitable handover candidates.

For example, the handover control processor 305 can proceed to remove all neighbour base stations from the subset which do not have a cell overlap indication which is indicative of a sufficiently high cell overlap. Thus, if a neighbour cell has been estimated to not meet a minimum overlap requirement, the neighbour cell is removed from the subset of candidate handover cells. As a specific example, any neighbour cells A-F that do not have an estimated overlap of at least 15% of cell A may be removed by the first base station 101.

It will be appreciated that step 409 in some embodiments may generate a subset of potential handover candidates which can include more than one neighbour cell. Alternatively or additionally, step 409 may include the selection of a single potential handover candidate for the user equipment 107. Specifically, from the subset generated in step 407 (i.e. a subset comprising base stations capable of supporting the user equipment 101 following a handover), step 409 can comprise the handover control processor 305 selecting the neighbour cell which has the highest cell overlap as the candidate cell for the handover of the user equipment 107.

Step 409 is followed by step 411 wherein the handover bias processor 307 proceeds to introduce a modification to a handover requirement for at least one communication of the user equipment 107 with respect to the neighbour base station(s) selected in step 409. The modification is introduced such that the communication/user equipment 107 is biased away from the first base station 101 towards the base station(s) from step 409.

In the specific example, the modification may simply be a reduction to the required handover margin in order to initiate a handover. For example, during normal non-congested operation, a user equipment may be handed over to a neighbour cell if the handover margin (the difference between the measured receive signal levels for the neighbour cell and the current serving cell) is, say, 9 dB. During congested operation, this handover margin requirement may be reduced to, say, 3 dB for the base station(s) selected in step 409.

Figure 4:
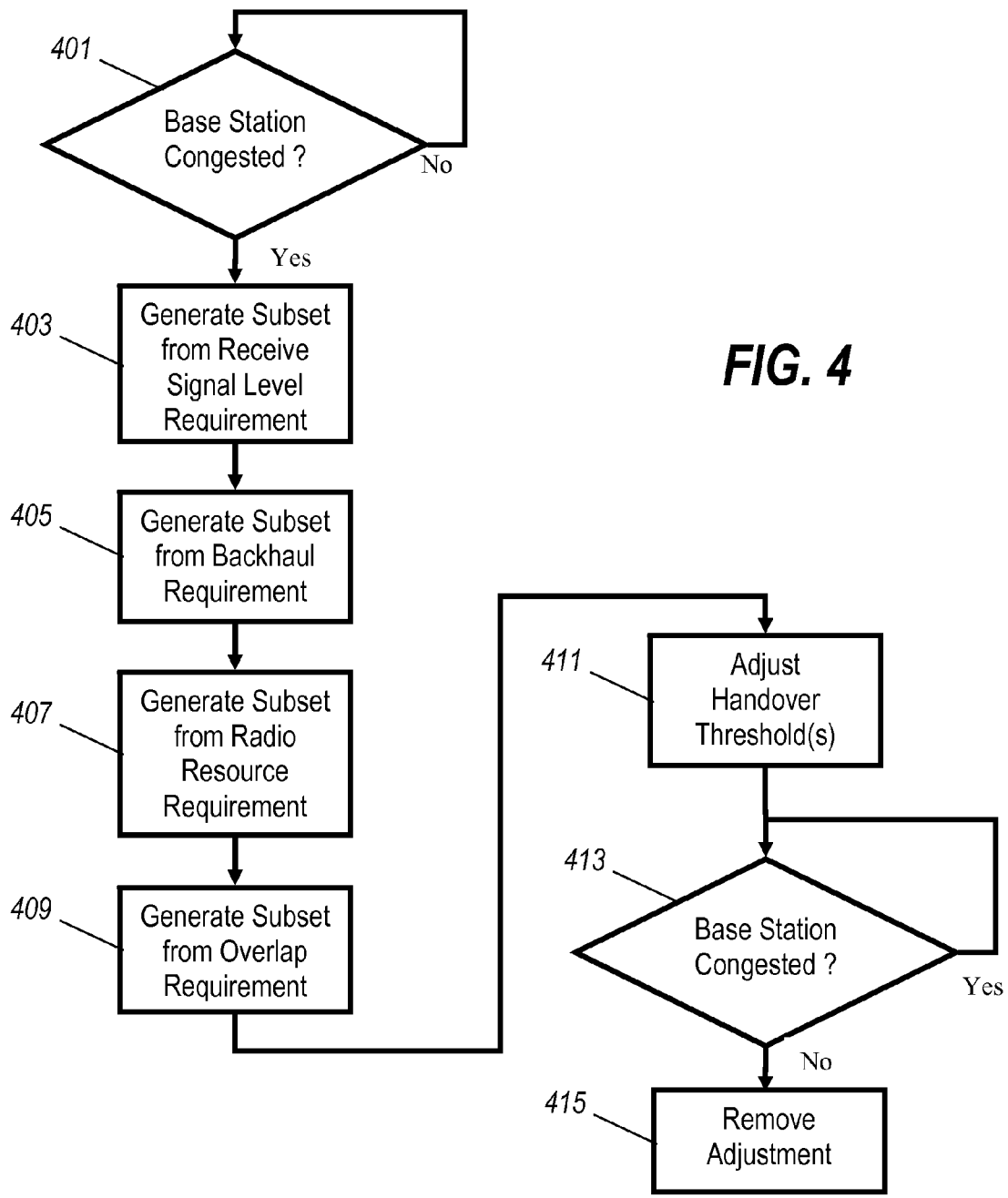
FIG. 4 is an illustration of a method of operation for a base station in accordance with some embodiments of the invention.

Thus, in the method of FIG. 4, a modification to a default handover requirement is introduced when the base station 101 is congested such that communications and user equipments 107 are biased away from the first base station 101. The neighbour base station towards which the user equipment(s) is(are) biased is selected such that the current conditions in the neighbour cell(s) is(are) sufficient to support the user equipment 107. Furthermore, the neighbour cell to which the user equipment 107 is handed over is selected taking into account the cell overlap between the current cell and the neighbour cell thereby resulting in an increased probability that the new cell can continue to support the user equipment 107 for some time.

Step 411 is followed by step 413 wherein it is evaluated if the first base station 101 is still congested. Typically, the congestion of a base station will be temporary and caused by an increased short-term loading of the base station. However, due to the change in the traffic pattern of the user equipments and/or the application of congestion relief, the base station will typically return to a non-congested state after a given duration.

In step 413 it is detected when the first base station 101 returns to a non-congested state. Step 413 may apply the same basic approach as used in step 401 and indeed the same criterion for determining congestion may be used. However, typically a modified congestion criterion is used to ensure that the base station 101 will not immediately return to the congested state (i.e. to avoid ping-ponging between the states). For example the loading threshold for considering a base station to transition from a congested state to a non-congested state is typically lower than the loading threshold for considering the base station to transition from the non-congested state to the congested state.

The handover control processor 305 remains in step 413 until the base station is no longer congested and it then proceeds to step 415 wherein the modification introduced in step 111 is removed. Thus, when the base station 101 returns to the non-congested state, the handover performance returns to normal operation (e.g. the handover margin requirement returns to 9 dB).

Thus, the method of FIG. 4 provides a highly efficient and low complexity approach to providing improved congestion relief and specifically allows an improved handover performance (with reduced dropped calls etc) in such situations.

In the previous description, the overlap processor 303 generates only a single cell overlap indication for each neighbour cell. However, in other embodiments the overlap processor 303 may generate a plurality of cell overlap indications for each neighbour cell.

Specifically, the base station 101 may be arranged to support different communication service types which have different Quality of Service requirements. For example, some communication services (such as voice communication) may have a relatively low data rate requirement whereas other communication services (such as video communication) have a relatively high data rate requirement. In such cases, the effective cell overlap between neighbour cells may be different for the different communication service types and the cell overlap indication for each service type may be generated by the overlap processor 303.

In such an example, the handover control processor 305 may treat different communication service types separately and may specifically for a given communication service perform the handover control based on the specific cell overlap indication that has been determined for the communication service type to which the specific communication service belongs.

Figure 5:
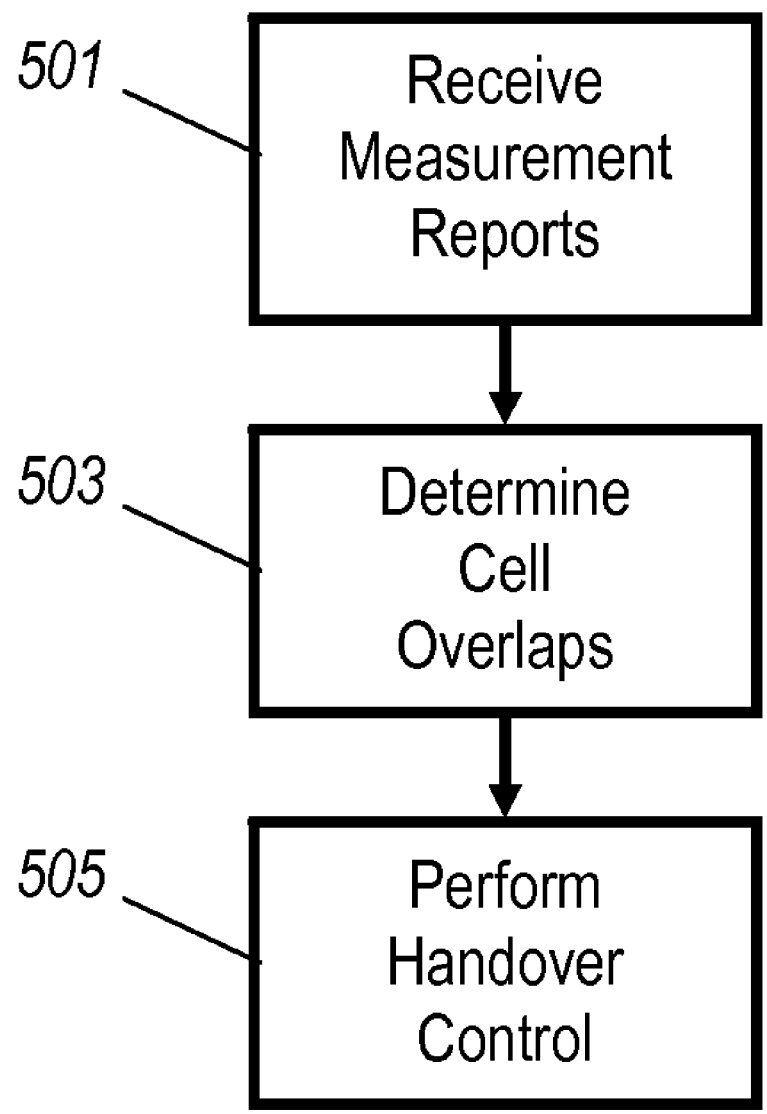
FIG. 5 is an illustration of a method of operation for a base station in accordance with some embodiments of the invention.

FIG. 5 is an illustration of a method of operation for a base station in accordance with some embodiments of the invention.

The method starts in step 501 wherein measurement reports are received from a plurality of user equipments served by the base station. The measurement reports comprise receive signal quality indications for neighbour cells of the base station.

Step 501 is followed by step 503 wherein a cell overlap indication is determined for each of a set of neighbour cells in response to the receive signal quality indications.

Step 503 is followed by step 505 wherein handover control is performed in response to the cell overlap indications.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A base station for a cellular communication system, the base station comprising:
    means for receiving measurement reports from a plurality of user equipments served by the base station, the measurement reports comprising receive signal quality indications for neighbour cells of the base station;
    overlap means for determining an amount of cell overlap with a first neighbour cell, the amount of cell overlap based on a proportion of the receive signal quality indications, for a first base station supporting the first neighbor cell that meets a first criterion; and
    control means for performing handover control in response to the amount of cell overlap;
    wherein the overlap means is arranged to generate amounts of cell overlap for a first base station for a plurality of communication service types having different Quality of Service requirements; and
    wherein the control means is arranged to perform handover for a first communication service in response to an amount of cell overlap for a communication service type corresponding to a communication service type for the first communication service;
    wherein the control means is further arranged to select a subset of neighbour base stations from the plurality of neighbour base stations as base stations meeting a handover criterion and to select the different base station as a base station of the subset of neighbour base stations in response to at least one of the amounts of Cell overlap of the subset of neighbour base stations.

2. The base station of claim 1 wherein the first criterion comprises a requirement that the receive signal quality indication is indicative of a receive signal quality level above a threshold.

3. The base station of claim 1 wherein the first criterion comprises a requirement that the receive signal quality indication is indicative of a quality level allowing a communication of the user equipment currently being supported by the base station to be supported by the first base station.

4. The base station of claim 1 wherein the control means comprises bias means arranged to bias at least one communication supported by the base station towards a different base station if a current air interface traffic characteristic for the base station meets a requirement that a loading measure of the base station exceeds a threshold.

5. The base station of claim 1 wherein the control means is arranged to:

generate a preference measure for each base station of at least some of the set of neigbbour cells, the preference measure being a function of an amount of cell overlap and a receive quality indication for each of the base stations of the at least some of the set of neighbour cells; and select the different base station as a base station of the at least some of the set of neighbour cells having a preference measure meeting a criterion.

6. The base station of claim 1 wherein the bias means is arranged to introduce a modification to a handover requirement for the at least one communication service and the different base station if the current air interface traffic characteristic for the base station meets the first criterion.

7. The base station of claim 1 wherein tile bias means is arranged to remove the modification to the handover requirement when the current air interface traffic characteristic for the base station meets a second criterion.

8. A method of operation of a base station for a cellular communication system, the method comprising:

receiving measurement reports from a plurality of user equipments served by the base station, the measurement reports comprising receive signal quality indications for neighbour cells of the base station;

determining an amount of cell overlap for each of a set of neighbour cells in response to the receive signal quality indications;

performing handover control in response to the amount of cell overlap;

generating amounts of cell overlap for a first base station for a plurality of communication service types having different Quality of Service requirements;

performing handover for a first communication service in response to an amount of cell overlap for a communication service type corresponding to a communication service type for the first communication service; and selecting a subset of neighbour base stations from the plurality of neighbour base stations as base stations meeting a handover criterion and to select the different base station as a base station of the subset of neighbour base stations in response to at least one of the amounts of Cell overlap of the subset of neighbour base stations.

* * * * *